April 22, 1969 F. W. MOUNTS ET AL 3,439,753

REDUCED BANDWIDTH PULSE MODULATION SCHEME USING DUAL MODE ENCODING IN SELECTED SUB-BLOCK SAMPLING PERIODS

Filed April 19, 1966 Sheet 1 of 2

INVENTORS: F. W. MOUNTS
B. PRASADA

BY John K. Mullarney
ATTORNEY

RECEIVER 3,439,753

REDUCED BANDWIDTH PULSE MODULATION SCHEME USING DUAL MODE ENCODING IN SELECTED SUB-BLOCK SAMPLING PERIODS

Frank W. Mounts, Murray Hill, N.J., and Birendra Prasada, Brighton, Mass., assignors to Bell Telephone Laboratories, Incorporated, New York, N.Y., a corporation of New York Filed Apr. 19, 1966, Ser. No. 543,609
Int. Cl. H04n *7/00;* H04b *1/04*
U.S. Cl. 178—6 9 Claims This invention relates generally to pulse code communication systems and more particularly to a dual mode pulse code modulation system to reduce transmission bandwidth requirements.

Figure 1:
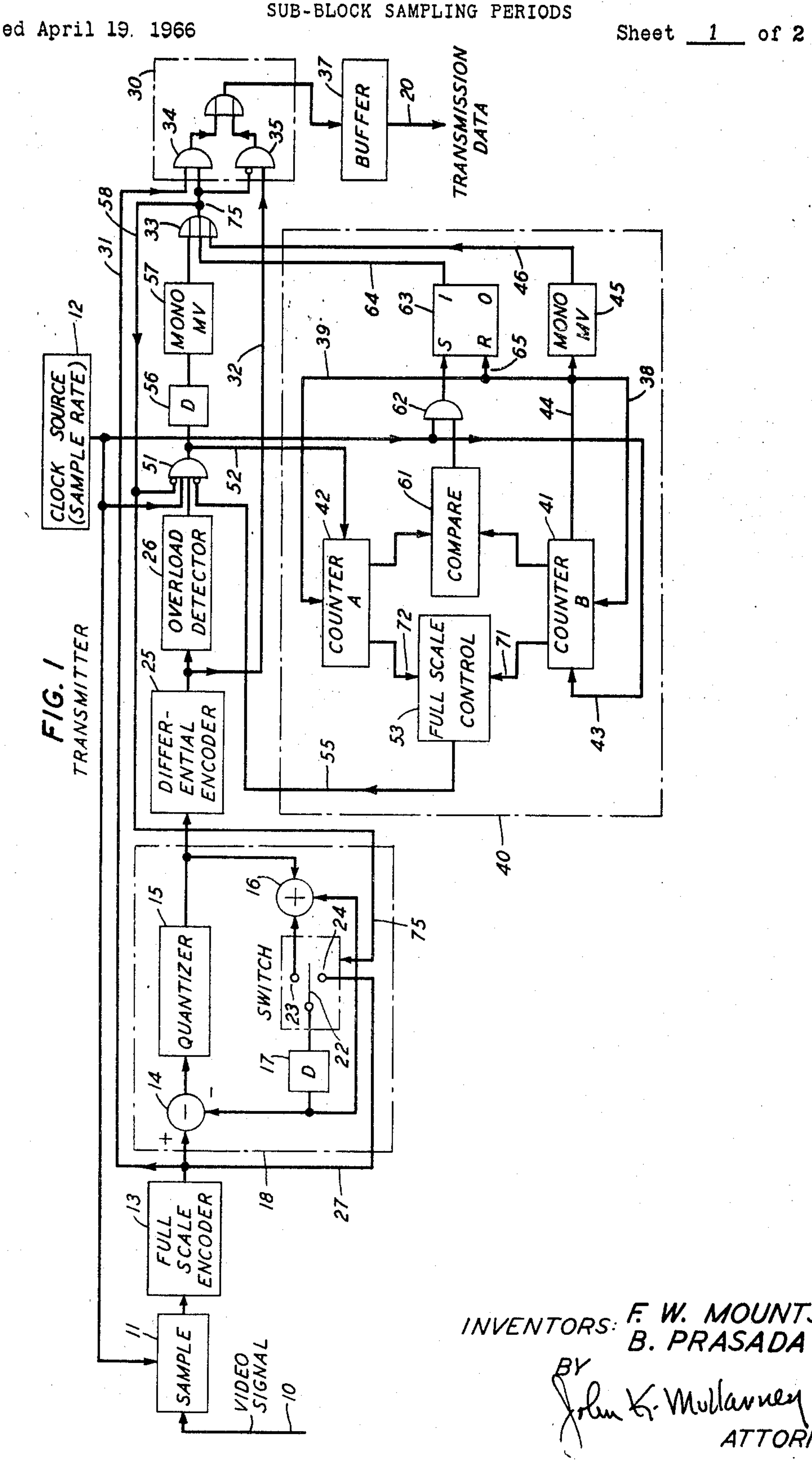

Many schemes have been proposed heretofore to reduce the transmission bandwidth requirements of pulse code modulation communication systems. These schemes are often concerned with reducing the number of digits required in the pulse code transmitted, by reducing the number of quantizing levels used to encode each sample of the signal. A particularly advantageous method of reducing the number of quantizing levels needed, without causing severe degradation of a video picture for example, is to use a system in which only the signal changes rather than the full signal itself is encoded and transmitted. A well known scheme utilizing this principle is "differential encoding."

In predictive differential encoding, prediction techniques are used to encode the difference between the signal then being sampled and a predicted value of the signal, rather than encoding the full value of the sampled signal. The predicted value is generally related to the signal of the preceding sample. Significant bandwidth savings are achieved because only the change in the signal need be encoded. Such signal changes on the average have a smaller amplitude range than the amplitude of the signal itself. It is readily apparent that a smaller number of quantizing levels are thus needed to encode the difference signal, and hence a smaller number of code digits are needed for the transmission of these levels. Such a differential encoding scheme is disclosed, for instance, in R. E. Graham Patent 2,905,756, issued Sept. 22, 1959.

Attention must be given in predictive type differential encoding arrangements to devising a pulse transmission scheme having a lower error probability than that of the standard pulse code modulation system. In the standard pulse code modulation system an isolated transmission error will affect only a single sample element at the receiver. In a differential encoding scheme, however, the error tends to propagate along with all the subsequent samples, because the receiver reconstructs the signal by continuously summing successive differences. Any errors in quantizing, encoding or transmitting these differences will therefore be cumulative.

In the transmission of video information, an additional limitation of differential encoding schemes arises. An important part of picture information is the edges of objects appearing in the picture. These edges generally represent a comparatively sharp amplitude discontinuity in successive samples of the video signal. Differential encoding has less amplitude discrimination capabilities than the conventional full scale pulse code encoding schemes, hence, an amplitude change in the video signal representing an edge may exceed the amplitude range of the differential code. As a result thereof, distorted brightness changes will occur at sharp contrast edges in the reproduced picture and successive lines will not register.

These limitations of differential encoding may be overcome by devising a scheme to transmit additional edge information. One such scheme involves two alternative modes of encoding samples of the video signal. Samples of the video signal are encoded in one manner where the signal is uniform and encoded in another manner where the signal changes sharply. Such schemes are known in the art as dual mode encoding. In one particular embodiment of dual mode encoding the samples of the signal where the continuous signal is fairly uniform are encoded in a differential code with few quantizing levels, and the samples of the signal where the continuous signal has sharp amplitude changes are encoded in a second code which has many quantizing levels and is able to fully encompass sharp amplitude changes. The second code usually comprises a full scale pulse code modulation code. Illustrative examples of dual mode encoding schemes are disclosed, for instance, in the copending applications of E. F. Brown, Ser. No. 491,528, filed Sept. 30, 1965, and W. T. Wintringham, Ser. No. 491,780, filed Sept. 30, 1965.

The present invention relates to a dual mode encoding arrangement of the aforementioned type wherein even further improvements in bandwidth reduction and picture definition are realized.

It is accordingly the primary object of the present invention to reduce the bandwidth necessary to transmit video information without degradation of sharp edges in the received picture.

It is a more specific object of the present invention to advantageously combine differential encoding with full scale encoding in a novel fashion such as to reduce the bandwidth requirements for the transmission of video signals and still retain good reproduction of sharp edges in the received picture.

It is a still further object of the present invention to selectively distribute full scale encoded sampling periods among differentially encoded sampling periods in an advantageous fashion to achieve an improvement in bandwidth reduction without significant degradation of sharp edges in the received picture.

In accordance with the present invention video signals are transmitted according to a dual mode pulse code modulation scheme. The pulse coded samples are arranged for transmission processing into master blocks. Each master block has a fixed number of samples and code digits. Each master block is further subdivided for processing into a number of sub-blocks. Each sub-block contains a fixed number of samples, but is flexible within a limited range as to the number of code digits it may contain. The first transmitted sample in each master block is encoded as a full scale pulse code. The succeeding samples are encoded as a differential pulse code. Should any sample encoded as a differential pulse code exceed some preselected differential threshold value the succeeding sample is encoded as a full scale pulse code. Each sub-block is allotted a certain number of samples which may be encoded as a full scale code if the threshold is exceeded. If the allotted numbered samples are not encoded as a full scale code, they are permitted to accumulate and may be utilized in some subsequent sub-block in addition to the full scale samples allotted to that subsequent sub-block. Accumulated samples which have not been utilized are used at the end of each master block to maintain a constant transmission rate.

The present invention advantageously reduces bandwidth by grouping the samples into master blocks and limiting the number of samples which may be full scale encoded within each master block. The danger of accumulated errors which may be incurred, should the limited number of full scale samples be required at the beginning of some master block, is avoided by subdividing the master block into sub-blocks and by providing for a distribution of the use of such full scale samples among these sub-blocks. In addition, by permitting accumulation of full scale codes unused by a sub-block to be utilized in a subsequent sub-block, a region in the video signal which changes amplitude rapidly and occurs at the terminal portion of the master block may generally be adequately full scale encoded without error. In this fashion the encoding of samples of a video signal may benefit from the advantages of differential encoding while avoiding its disadvantages.

These and other objects and features, the nature of the present invention, and its various advantages may be more readily understood upon consideration of the accompanying drawings and the following detailed description.

Figure 2:
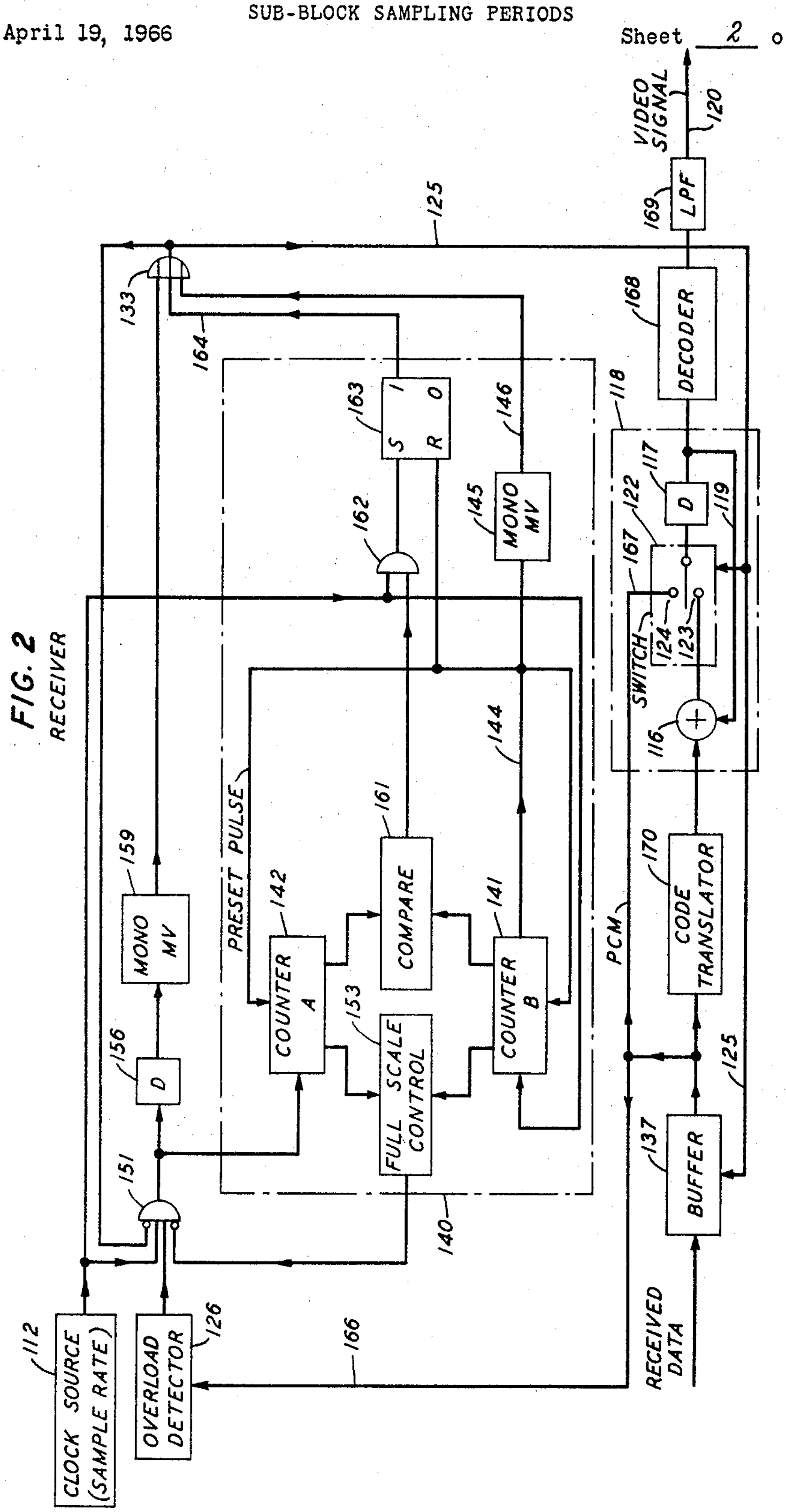

In the drawings:

FIG. 1 is a detailed block diagram of a dual mode full scale-differential scale pulse code modulation transmitter in accordance with the present invention; and FIG. 2 is a detailed block diagram of a dual mode full scale-differential scale pulse code modulation receiver in accordance with the present invention and usable with the transmitter of FIG. 1.

Referring now more particularly to FIG. 1, there is shown a block diagram of a dual mode pulse code modulation transmitter according to the invention. The transmitter of FIG. 1 comprises an input terminal 10 to which analog video signals are applied and an output terminal 20 at which a train of pulses, at a constant rate, representing the analog signal in pulse code is transmitted to some receiver. The analog video signal at terminal 10 is applied to the sampling circuit 11. Clock pulses derived from the clock pulse source 12 are applied to the sampling circuit 11 to enable the periodic sampling of the video signals. These samples are applied to a full scale pulse code encoder 13 which, in the well known fashion, quantizes the amplitude of each analog sample and encodes the quantized level into a binary pulse code having "A" digits. The "A" digit code for illustrative purposes is assumed to have eight digits representing two hundred fifty-six quantizing levels.

The eight-digit code output of the full scale encoder 13, representing the full amplitude of each sample, is applied to the subtractor 14 of the error function generator 18. The subtractor 14 combines the digitally encoded input signal with a digitally encoded predicted version of this signal (i.e., the encoded value of the previous sample) and derives a digital error signal representative of the difference between the two signals. This digital error signal is quantized into fewer more coarse quantizing levels by the quantizer 15. The quantizer 15 may be of any digital type known in the art; it is preferable, however, that it be a nonlinear quantizer. In a nonlinear quantizer small signal differences are finely quantized while large signal differences are coarsely quantized. Suitable quantizers of this nature are well known in the art. The output of the quantizer 15 is a tapered multilevel quantized signal representing the error or difference signal derived from the subtractor 14. This error signal is then applied to the differential pulse code encoder 25 which encodes the quantized difference signal into a binary code having "B" digits. The "B" digit code for illustrative purposes is assumed to have three digits representing eight quantizing levels.

The output of the quantizer 15 is fed back to the subtractor 14 through an accumulator network which comprises an adder 16, a control switch arm 22 normally in contact with contact 23, and a delay circuit 17. The delay circuit 17 has a delay time equal to the sampling period. It will be clear to those skilled in the art that each input to the quantizer 15 is a digitally encoded signal equal to the error or difference between the encoded value of the signal sample applied to the subtractor 14 and the predicted value of the present sample, reconstructed from the previous sample, which is delayed for one sampling period by the delay circuit 17. A new predicted full scale value is created for the purpose of generating the next error or difference signal by applying the output of the delay circuit 17 to the adder 16 where the present error or difference signal is combined with the previous full scale signal value to generate a new predicted full scale signal value. This new predicted full scale signal value is then used in generating the error signal during the next succeeding sampling period.

When a full scale encoded sample is to be transmitted to the buffer 37, the switch arm 22 is connected to contact 24 in response to a control signal applied via control lead 75. With the switch arm 22 in this position the accumulator of the error function generator 18 is cleared and the full scale pulse code is directly stored, via lead 27, in the delay circuit 17 of the accumulator to be used as the previous value for the prediction of the next succeeding sample. It will be readily apparent that this signal insertion avoids the accumulation of errors due to errors in the encoding of prior differential encoded samples.

The error or difference signal output of the error function generator 18 is applied to a differential pulse code encoder 25, which as indicated above encodes the quantized error signal in a three-digit code. It is to be understood that one-half of the differential quantizing levels will be used to encode an increasing signal and the other half a decreasing signal. When the code output of the differential encoder 25 represents either of the two outermost quantizing levels, representing the extreme positive or negative level available, the overload detector 26 is activated and generates an output signal representative of a binary "1." This output signal is used to initiate the insertion of a full scale encoded representation of the next succeeding sample in the buffer 37 in a fashion to be explained herein below.

The full scale encoded samples and the differentially encoded samples are applied to a multimode steering network 30, via the leads 31 and 32, respectively. A control signal corresponding to a binary "1" applied, via OR gate 33, to the two AND gates 34 and 35 enables AND gate 34 and thereby permits a full scale encoded sample to be conveyed to the buffer 37. This control signal inhibits AND gate 35 and thus blocks the delivery of the differentially encoded sample to the buffer 37. Similarly, a control signal corresponding to a binary "0" permits a differentially encoded sample to be conveyed to the buffer 37. The buffer 37 stores all the encoded samples of a master block and transmits all of its respective code digits to the receiver, at the end of the encoding of each master block, at a constant rate. The buffer 37 may comprise a shift register or some equivalent means known in the art.

The master block in the illustrative embodiment is defined by a timing interval divided, for example, into forty sampling periods. This timing interval is further subdivided into four sub-block intervals, each having ten sampling periods. The number of coded digits in the master block is fixed, for example, at 160 digits but in any sub-block the number of code digits may vary within specified upper and lower bounds. Thirty-two samples of each master block are differentially encoded and eight samples are full scale encoded. Two full scale encoded samples are allotted to each sub-block. The first sample of each master block stored in the buffer 37 is encoded as a full scale representation of the sampled signal. This permits one more sample which may be full scale encoded to be utilized in the first sub-block. If the second sample which is differentially encoded should exceed the differential threshold, the third sample of the first sub-block will be full scale encoded. Since the full quota of full scale samples allotted to the first sub-block have then been utilized, the transmitter is constrained not to permit any more full scale encoded samples to be stored in the buffer 37 in the first sub-block. All the remaining seven samples in the first sub-block must therefore be differentially encoded regardless of the signal change. However, if no samples in the first sub-block exceed the differential threshold, the remaining full-scale sample allotted to it will carry over into the second sub-block. The second sub-block may then contain three samples encoded as a full scale representation of the video signal although only two such samples are allotted to it. If at any time the number of samples remaining to be encoded in a master block equals the number of samples remaining that may be full scale encoded, the transmitter is constrained to encode the remaining samples as a full scale representation of the signal. It is to be understood that the size of the master block and its respective sub-blocks as specified here is intended to be illustrative only, and is not intended to limit the scope of applicants' invention. Numerous other combinations and variations of this arrangement will be readily apparent to those skilled in the art.

The generation of the proper control signal, on control lead 75, to select the proper encoded sample to be stored in the buffer 37 is the function of the overload detector 26 and the encoding scheme selector 40. The encoding scheme selector 40 comprises two counters 41 and 42 and associated logic circuitry to integrate the action of the two counting circuits. The overload detector 26 and the encoding scheme selector 40 will permit differentially encoded samples to be entered in the buffer 37 for the purpose of transmission except in the following specifically enumerated instances wherein: (1) The sample to be encoded and stored in the buffer 37 is the first sample of the master block; (2) the previous encoded sample is a differentially encoded sample having a change in magnitude from its preceding sample equal to or exceeding the maximum quantizing level of the differential code. This response, however, is dependent upon the availability of samples allotted and accumulated to the present sub-block which may be full scale encoded; and (3) the number of allotted and accumulated samples which may be full scale encoded is equal to the number of samples remaining to be encoded in the master block.

The two counters 41 and 42 of the encoding scheme selector 40 are backward counters. That is, each counter is preset to some maximum count level. Each subsequent input signal to the backward counters then reduces the stored count by one. At the beginning of the encoding of each master block, counter 41 is preset to its maximum count by means of a clock pulse from the clock pulse source 12, applied via lead 43. Counter 41 includes an internal gating arrangement such that when the state of the counter is zero the next input clock pulse is transmitted to its output lead 44. This output pulse is applied via lead 38, to again preset counter 41. The preset count in counter 41 represents the number S–1 where S is the total number of samples in the master block. In the illustrative example this represents thirty-nine samples which are the number of samples remaining after the first sample is encoded.

The aforementioned clock pulse, transmitted by counter 41, is utilized to preset counter 42, via lead 39. Counter 42 is preset to a count of P–1 where P represents the total number of samples in a master block which may be full scale encoded. P–1 in the illustrative embodiment represents the seven samples which remain to be full scale encoded after the first sample is so encoded.

The counting state of counter 41 is responsive to the clock pulses of the clock pulse source 12. Each clock pulse applied, via lead 43, reduces the state of counter 41 by a count of one.

The counting state of counter 42 is responsive to the signal output of the overload detector 26. Each time the overload detector 26 responds to a maximum sized differential code it generates a pulse output signal which is applied to the counter 42, via AND gate 51 and lead 52. This pulse signal is utilized to decrease the state of counter 42 by a count of one and hence maintain an active count of the remaining samples in a master block which may be full scale encoded. Counters which are suitable for the above applications are well known in the art and it is not believed necessary to describe such a counter in detail.

The clock pulse presetting counter 41 at the beginning of each master block is steered by internal gating in the counter, as hereinabove described, to the output lead 44 of the counter. This gated pulse signal applied to the monostable multivibrator 45 induces a transition therein from its stable to its quasi-stable state. The monostable multivibrator 45 in its quasi-stable state produces an output pulse signal on lead 46. The duration of this output pulse signal is equal to one sampling period. The output pulse of multivibrator 45, which corresponds to a binary "1," is applied over lead 46 and via the OR gate 33 to the multimode steering network 30 and it enables AND gate 34. The AND gate 34 in its enabled condition permits a full scale encoded sample applied, via lead 31, to be conveyed to the buffer 37. Thus, it is readily apparent that the very first sample of every master block will be encoded and stored in the buffer 37 as a full scale encoded sample.

The full scale control circuit 53 functionally limits the number of permissible full scale encoded samples that are permitted within each sub-block. The control circuit 53 comprises logic gating circuitry which continuously monitors the counts stored respectively in the counters 41 and 42, via the leads 71 and 72. The gating circuits therein are responsive to certain predetermined count combinations of the two counters 41 and 42 that indicate if all the available full scale samples allotted and accumulated to a certain sub-block have been utilized. For instance, if counter 41 indicates that twenty-seven samples remain to be encoded in the master block and counter 42 indicates that four full scale samples have already been encoded, the control circuit 53 will recognize that no further samples may be full scale encoded until the entire second sub-block is processed and will generate a continuing control signal to prevent the conveyance of full scale encoded samples to the buffer 37 until the encoding of the present sub-block is complete.

When all the allotted and accumulated full scale encoded samples have been utilized, the continuing output signal of the control circuit 53 corresponds to a binary "1" and is applied, via lead 55, to the inhibit input of AND gate 51. This inhibits transmission of the output of the overload detector 26 to the counter 42 and to the multimode steering network 30. The control circuit 53 will maintain this continuing signal until a new sub-block of samples is processed at which time a new limit of permissible full scale encoded samples is established. The control circuit 53 may comprise any appropriate logic gating circuitry which will gate pulse signals in response to preselected input pulse signals representing preselected respective counts in counters 41 and 42. Suitable arrangements to accomplish this can be readily devised by those skilled in the art and it is not believed necessary to describe such a circuit in detail.

The pulse signal output of the overload detector 26, in response to a maximum size differentially encoded sample, is transmitted, by the AND gate 51, and applied to the delay circuit 56. The delay circuit 56 delays the pulse for a time sufficient to delay its transmission to the monostable multivibrator 57 until the beginning of the next sampling period. This pulse signal then switches the monostable multivibrator 57 to its quasi-stable state. The quasi-stable state of the monostable multivibrator 57 has a time period equal to a sampling period. The multivibrator 57 in its quasi-stable state applies an output signal, via the OR gate 33, to the multimode steering network 30 and enables AND gate 34 for the duration of this sampling period. The enabled AND gate 34 permits the transmission of a full scale encoded sample, applied via lead 31, to the buffer 37. Since AND gate 35 is disabled, no differentially encoded sample is transmitted to the buffer 37.

The output pulse of the multivibrator 57 is also fed back, via lead 58, to an inhibit input of AND gate 51 to disable it from transmitting an overload pulse generated by the overload detector 26, thus ensuring that the next sample applied to the buffer 37 is differentially encoded.

The respective counts contained in counters 41 and 42 are compared to each other in comparison circuit 61. The output of the comparison circuit 61 will correspond to a binary "0" if the count in counter 41 exceeds the count in counter 42. However, when the two counts in the two counters coincide, that is, when the number of samples remaining in the master block is equal to the number of full scale encoded samples that are available to be used, the output of the comparison circuit 61 will correspond to a binary "1". The comparison circuit 61 may be an exclusive OR gate circuit although other varied designs will readily suggest themselves.

The output of the comparison circuit 61 is applied, via AND gate 62, to a bistable multivibrator 63. In response to a signal corresponding to a binary "1" the bistable multivibrator 63 is set to its "1" state to produce a continuous signal output. This continuous signal is applied, via lead 64, and the OR gate 33 to the multimode steering network 30, thereby enabling AND gate 34. AND gate 34, in a conducting condition, permits the full scale encoded samples applied, via lead 31, to be conveyed to the buffer 37. Thus, it is readily apparent that when the counts in counters 41 and 42 coincide all the remaining samples in the master block conveyed to the buffer 37 will be encoded as full scale representations of the samples. This ensures that the number of code digits transmitted in each master block remains a constant. At the beginning of the next master block, the bistable multivibrator 63 will be reset by the clock pulse transmitted by the counter 41.

It is readily apparent from the foregoing that the transmitter of FIG. 1 operates to generate pulse coded representations of the samples of a video signal. The transmitter groups these samples into master blocks having a fixed number of samples and into sub-blocks, which subdivide the master block into equal sized subgroups of samples. A certain number of samples are alloted to each sub-block which may be encoded as a full scale representation of the signal if the previous differentially encoded sample has exceeded some threshold. It is readily apparent then that significant band saving is achieved by using full scale encoding only when it is needed and by encoding in a differential code requiring fewer digits wherever possible. It is to be understood that while the foregoing has been described with respect to specific digital processing equipment, many other embodiments employing applicants' invention will be readily apparent to those skilled in the art.

Turning now to FIG. 2, there is shown a block diagram of a dual mode pulse code modulation receiver which may be used to receive the pulse code groups generated in the transmitter shown in FIG. 1. The pulse codes conveyed to the receiver are transmitted to it at a uniform digital bit rate. These pulse codes are applied to and stored in a buffer 137. A control signal applied, via lead 125, directs the buffer to read out binary codes at one of two selected readout rates, which may be selected so that the time duration necessary to read out each full scale or differentially encoded sample will be equal. This control signal is generated by an overload detector 126 and a decoding scheme selector 140, both of which are identical in operation to the overload detector 26 and the encoding scheme selector 40 used in the transmitter shown in FIG. 1.

The first sample in every master block received by the receiver is a full scale encoded sample. The two counters 141 and 142 are initially preset at the beginning of each master block to a count equaling respectively one less than the number of total samples and full scale samples allotted to each master block. As in the transmitter described in FIG. 1, the initial clock pulse signal applied to the counter 141 is gated as an output pulse on lead 144, and is used to preset both counters 141 and 142.

The aforementioned gated output pulse, applied via lead 144, triggers the monostable multivibrator 145 into its quasi-stable state. The activated monostable multivibrator in its quasi-stable state applies a pulse signal, for the duration of one sampling period to the OR gate 133. The OR gate 133 transmits this pulse signal to the control signal lead 125. The control lead 125 in turn transmits this signal both to the buffer 137 and to the control switch 122. Since the control signal is representative of a binary "1" it causes switch 122 to connect to the contact 124. The buffer 137, in response to this control signal, reads out the digits corresponding to the first sample at a readout rate appropriate to full scale encoded samples.

The aforementioned full scale code is applied to the delay circuit 117, via lead 167, and from thence to a full scale pulse code decoder 168. The decoder 168 operates in the well known fashion to translate the eight digit code representing the video signal into its corresponding analog signal. The output of the decoder 168 is applied to a low-pass filter circuit 169 and from thence to the video output terminal 120. The filter circuit 169 removes the sampling frequencies and applies the reconstructed baseband video signal to the output terminal 120.

At the beginning of the next sampling period the multivibrator 145 returns to its stable state. Hence, the control signal on lead 125 during the next sampling period is absent or may be considered a signal representative of a binary "0." In response to this latter signal, i.e., an absence of a signal, the buffer 137 reads out the next code at a readout rate appropriate to differentially encoded samples. The switch 122, in response to this absence of a signal, is now connected to contact 123.

The differentially encoded sample is applied to a differential code translator 170 which translates the three-bit differential code into an eight-bit code. Translators suitable for this purpose are well known in the art. The eight-bit code output of the translator 170 is applied to an accumulator circuit 118 which comprises an adder 116, a delay circuit 117 and a feedback loop 119. At the start of each master block, when switch 122 is connected to contact 124, a full scale encoded sample is applied directly to the delay circuit 117. The delay of the delay circuit is equal to one sampling period. The succeeding differentially encoded sample converted to an eight-bit code by the translator 170, is then applied to the adder 116. The previous full scale sample, which has been delayed by delay circuit 117 for the sampling period, is also applied to the adder 116 by the feedback loop 119. It is readily apparent to those skilled in the art that the output of the adder 116 therefore represents the full scale representation of the differentially encoded sample. This reconstructed full scale sample is then stored in the delay circuit 117 for use in deriving a full scale representation of the signal from the next succeeding differentially encoded sample applied to the translator 170.

The output of the buffer 137 is applied, via lead 166, to the overload detector 126. The overload detector 126 in response to differentially encoded samples encoded at their maximum positive or negative quantization levels, generates a pulse signal output representative of a binary "1." This pulse signal is transmitted, via the AND gate 151, to the delay circuit 156 which delays the transmission of the pulse signal until the beginning of the next succeeding sampling period. The output of the delay circuit 156 is applied to a monostable multivibrator 159 and switches it into its quasi-stable state. The multivibrator in this state produces an output pulse representative of a binary "1" and having a duration equal to one sampling period. This output pulse is applied, via the OR gate 133, to the control lead 125. This control signal, on control lead 125, directs the buffer 137 to read out the next sample, which is full scale encoded, at the appropriate readout rate. This full scale encoded sample is applied, via switch 122, directly to the delay circuit 117 and from thence to the decoder 168.

The pulse output of the monostable multivibrator 159 is also applied, via the feedback loop 158, to an inhibit input of the AND gate 151. This inhibit signal disables the transmission of signals generated by the overload detector 126 to the control lead 125. The transmission of these signals is inhibited, because the next succeeding sample transmitted to the receiver will generally be encoded differentially, with the exception of full scale terminal samples covered hereinbelow.

The control circuit 153, which is identical to the control circuit 53 shown in FIG. 1, applies an inhibiting input signal to the AND gate 151 in response to certain preselected simultaneous conditions in the two counters 141 and 142. As in the case of the transmitter, the control circuit 153 prohibits the application of a control signal to the buffer 137 during periods when all the allotted full scale samples having been utilized. The control circuit acts in exactly the same manner as is described for the transmitter in FIG. 1, and a detailed explanation of its action in the receiver is not believed to be necessary.

The comparison circuit 161, which is identical to the comparison circuit 61 shown in FIG. 1, monitors the two counters 141 and 142 and compares the respective counts stored therein. As in the case of the transmitter, if the count stored in counter 141 exceeds the count stored in counter 142, the output signal of the comparion circuit 161 is a signal representative of a binary "0." If however, the two stored counts are equal, that is, the number of samples remaining in the master block equals the number of full scale samples available, the output of the comparison circuit is a signal representative of a binary "1." This signal is transmitted, via the AND gate 162, to the bistable multivibrator 163. This sets the bistable multivibrator 163 in a condition so that a signal output representative of a binary "1" is applied, via lead 164, to the OR gate 133. From thence this signal is applied, via control lead 125, to the buffer 137. The buffer 137 upon receipt of this signal is constrained to read out pulse codes at a rate appropriate to full scale encoded samples. This signal, also as described hereinabove, connects the control switch 122 to contact 124. Thus, it can be seen that the comparison circuit 161 ensures that when the count in counter 141 corresponds to the count in counter 142 all the remaining samples in a master block will be processed by the receiver as full scale encoded samples in accordance with the action of the transmitter shown in FIG. 1.

It will be readily apparent to those skilled in the art that the above-cited sizes of the respective code and block lengths are merely illustrative and not intended to limit the scope of applicants' invention. The proper selection of master and sub-block lengths will be dependent on the nature of the signal to be transmitted and the noise characteristics of the transmission channel. For instance, the video transmission of printed written material with many sharp edges would require a smaller block size than a picture which has relatively few abrupt brightness changes. The selection of proper code lengths and block lengths will be readily apparent to those skilled in the art based on the particular requirements of video information they wish to transmit.

It is to be understood that the above-described arrangements are merely illustrative of the numerous and varied other arrangements which may constitute applications of the principles of the inventinon. Such other arrangements and modifications may readily be devised by those skilled in the art without departing from the spirit and scope of this invention.

What is claimed is:

1. A television transmission system comprising transmitting means, receiving means, and communication channel means interconnecting said transmitting means and said receiving means, said transmitting means comprising a source of video signals, means to sample said video signals, differential encoding means, full scale encoding means, means to process said samples for the purposes of encoding and transmission in master blocks having a fixed number of samples, means to subdivide said master blocks into sub-blocks each having a fixed number of samples, means selecting said differential encoding means to encode samples where said video signal changes slowly, means to select said full scale encoding means to encode samples where said video signal changes rapidly, means to limit the number of samples which may be full scale encoded in any one of said master blocks, means to distribute the utilization of full scale encoded samples within one of said master blocks by allotting a specified number of full scale encoded samples to each of said sub-blocks, means to accumulate the utilization of full scale encoded samples not utilized in any one of said sub-blocks and to allot said accumulated samples to any subsequent one of said sub-blocks, and means to transmit said master blocks of encoded samples to said receiving means, said receiving means comprising, means to decoded differentially encoded samples, means to decode full scale encoded samples, and means responsive to the rate of change of said transmitted encoded samples to select the appropriate one of said decoding means.

2. A television transmission system in accordance with claim 1 wherein said distributing means includes first counting means to maintain an active count of samples remaining in a master block, second counting means to maintain an active count of samples remaining in a master block which may be full scale encoded and means to compare the counting state existing in said first and second counting means and elect the appropriate one of said encoding means in response to certain preselected simultaneous conditions existing in said first and second counting means.

3. A television transmission system in accordance with claim 2 wherein said limiting means includes means to respond to encoded samples of signals when the respective code of said encoded sample represents one of the outermost quantization levels used to encode said samples.

4. A television transmission system in accordance with claim 3 wherein said transmitting means includes means to store an entire master block of encoded samples and means to read out said stored encoded samples at a constant digital rate.

5. A video transmission system comprising a source of video signals, means to sample said video signals, means to apportion the samples of said video signals into a master block length having a fixed number of samples, means to subdivide said master block into a plurality of sub-blocks, each sub-block having an equal number of samples, means to encode the first transmitted sample of each master block as a full scale representation of the signal amplitude of said video signal, means to encode the subsequent samples succeeding said first sample as a differential code representing the signal difference between each sample and its immediate preceding sample, means to detect when said signal difference exceeds a preselected threshold and to encode the next succeeding sample as a full scale representation of the signal amplitude, means to allocate to each of said sub-blocks a certain number of samples which may be full scale encoded, means to increase the number of samples which may be full scale encoded and are allocated to any particular sub-block by the number of such samples, allocated to a preceding sub-block but not used in said preceding sub-block, and means to utilize all unused accumulated samples which may be full scale encoded as the terminal samples transmitted in said master block.

6. A video transmission system according to claim 5 wherein said means to allocate comprises first counting means to count the number of unencoded samples in a master block, second counting means to count the number of unused samples in a master block which may be full scale encoded, means to examine said first and second counting means and inhibit the encoding of samples as full scale representations of said video signal upon the realization of preselected simultaneous conditions in said first and second counting means, and wherein said means to utilize includes means to compare the count in said first and second counting means and to enable continuous encoding of samples as full scale representations of said video signal when said respective counts are equal.

7. A video transmission system according to claim 6 wherein said means to detect comprises means responsive to encoded samples of video signals wherein the respective code of said encoded sample represents one of the two outermost quantization levels used to encode said samples.

8. A video transmission system according to claim 7 further including means to store an entire master block of encoded samples and means to transmit the component code digits of said master block at a constant rate.

9. A method of transmitting a video signal comprising the steps of sampling the video signal, apportioning the samples of said video signal into master blocks subdividing said master blocks into a plurality of sub-blocks, each sub-block having an equal number of samples, encoding the first transmitted sample apportioned to each master block as a full scale represenation of the signal amplitude of said video signal, encoding the subsequent samples succeeding said first sample as a differential code representing the signal difference between each sample and its immediate preceding sample, detecting when said signal difference exceeds a preselected threshold and in response thereto encoding the next succeeding sample as a full scale representation of said signal amplitude, allocating to each of said sub-blocks a certain number of samples which may be full scale encoded and increasing the number of samples which may be full scale encoded and are allocated to any particular sub-block by the number of such samples allocated to a preceding sub-block but not used in said preceding sub-block and utilizing all unused accumulated samples which may be full scale encoded as the terminal samples transmitted in said master block.

References Cited

UNITED STATES PATENTS

| | | |
|---|---|---|
| 3,035,121 | 5/1963 | Mounts. |
| 3,071,727 | 1/1963 | Kitsopoulos. |
| 3,090,008 | 5/1962 | Schreiber. |

RALPH D. BLAKESLEE, *Primary Examiner.*

B. LEIBOWITZ, *Assistant Examiner.*

U.S. Cl. X.R.

325—38